United States Patent [19]
Bletcher et al.

[11] 3,722,798
[45] Mar. 27, 1973

[54] COMBINED AERATOR-SPRAY ASSEMBLY

[75] Inventors: James H. Bletcher, Pacific Palisades; Jack K. Rauh, Hacienda Heights, both of Calif.

[73] Assignees: trust of Ralph E. Bletcher, deceased; Frederick Robertson; Gary Robertson; Lenora Bucknell; Richard J. Bletcher; Marcia Liston, trustee; Daniel E. Liston; Carl A. Liston; James H. Liston; Hazel Brondum; Pearl Bletcher; Ernest H. Bucknell, ; part interest to each

[22] Filed: Oct. 29, 1970

[21] Appl. No.: 85,102

[52] U.S. Cl. ............239/428.5, 137/625.5, 239/445, 239/447, 239/449, 239/586
[51] Int. Cl. .............................................B05b 1/16
[58] Field of Search...239/396, 428.5, 442, 445, 446, 239/447, 449, 575, DIG. 18; 137/625.5

[56] References Cited

UNITED STATES PATENTS

| | | | |
|---|---|---|---|
| 2,726,120 | 12/1955 | Bletcher et al. | 239/449 |
| 3,524,591 | 8/1970 | Samuels et al. | 239/428.5 |
| 3,545,473 | 12/1970 | Moia | 137/625.5 X |
| 2,882,007 | 4/1959 | Conlan | 137/625.5 X |
| 3,011,725 | 12/1961 | Shames et al. | 239/575 X |
| 3,341,132 | 9/1967 | Parkison | 239/428.5 X |
| 3,057,377 | 10/1962 | Chatham et al. | 137/625.5 |
| 3,424,260 | 1/1969 | Stone et al. | 137/625.5 X |

*Primary Examiner*—Richard A. Schacher
*Assistant Examiner*—Reinhold W. Thieme
*Attorney*—Lyon & Lyon

[57] ABSTRACT

There is disclosed herein a swinging spray assembly including both aerator and spray devices. A push button valve is provided to divert water through either an aerator or through openings around the aerator to provide a spray. The valve assembly includes collar members formed of a resilient mvterial and which are formed in a manner such that in either position of the valve fluid pressure tends to maintain the valve in a selected position.

7 Claims, 7 Drawing Figures

Patented March 27, 1973

INVENTORS.
JAMES H. BLETCHER
JACK K. RAUH
BY Lyon & Lyon
ATTORNEYS

Patented March 27, 1973 3,722,798
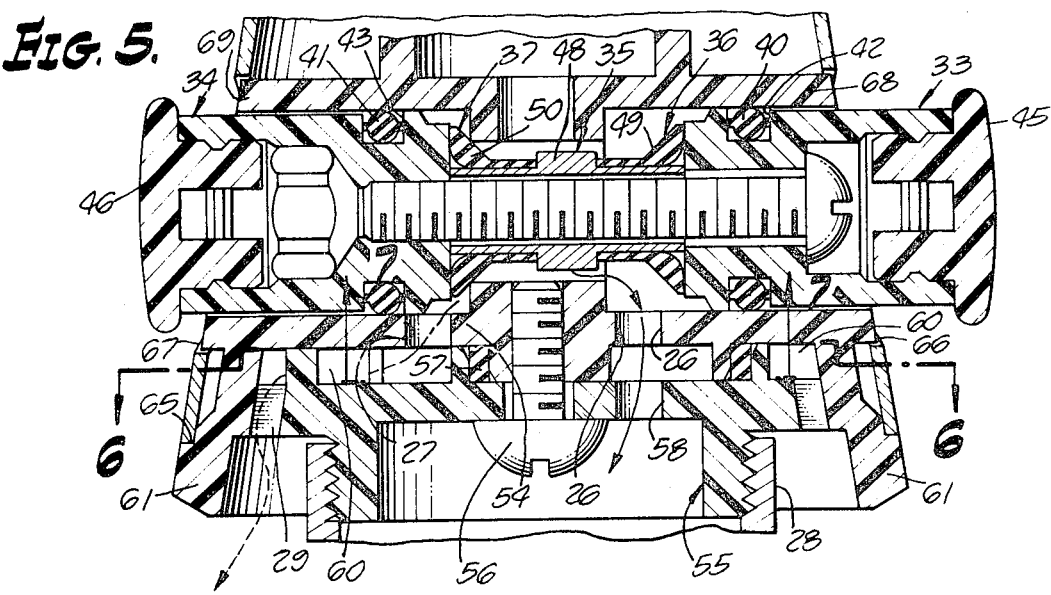
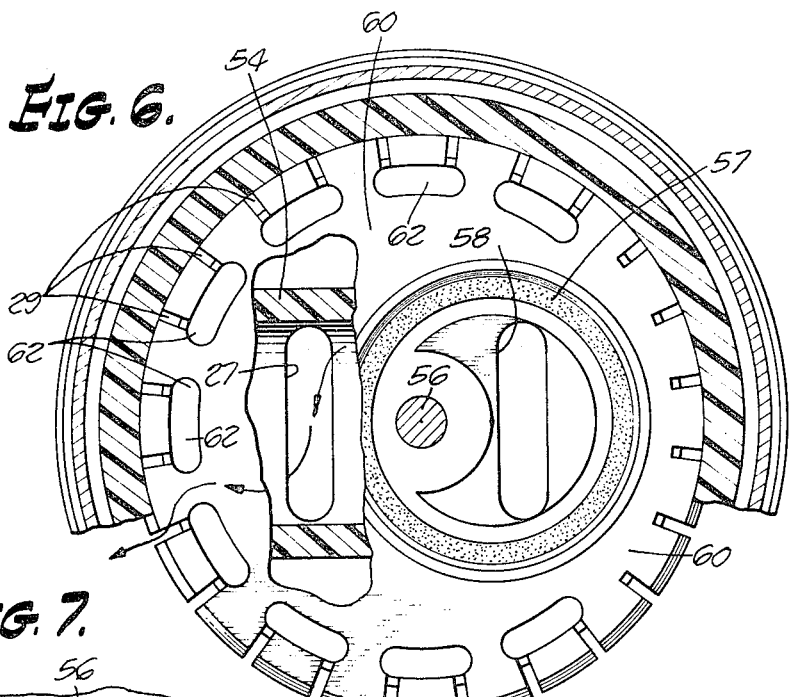
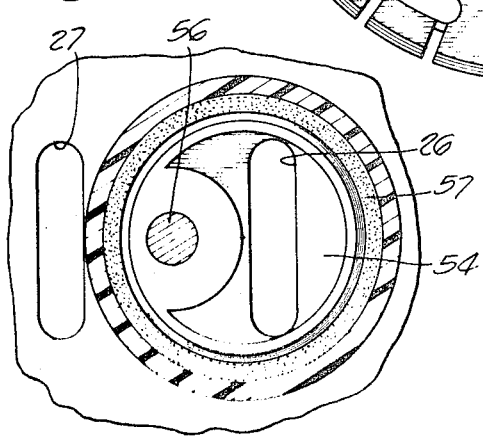
INVENTORS.
JAMES H. BLETCHER
JACK K. RAUH
BY Lyon & Lyon
ATTORNEYS

COMBINED AERATOR-SPRAY ASSEMBLY

This invention relates to faucet devices and more particularly to a swinging spray assembly for providing either an aerated discharge or a spray discharge which is useful with kitchen faucets, showers and the like.

Various types of faucet devices have been made in the past for providing either an aerated flow of water, a spray or a combination of the two. In many instances such devices have been of relatively complex construction, or constructed in a manner so as to be difficult to assemble or disassemble for cleaning.

Accordingly, it is a principal object of the present invention to provide an improved combination aerator-spray assembly.

It is an additional object of this invention to provide an improved assembly for selectively providing an aerated flow or a spray flow of fluid.

A further object of this invention is to provide a swinging spray assembly including a selectively positionable valve member for selecting either an aerated or spray flow.

These and other objects and features of the present invention will become better understood through a consideration of the following description taken in conjunction with the drawings in which.

Figure 1:
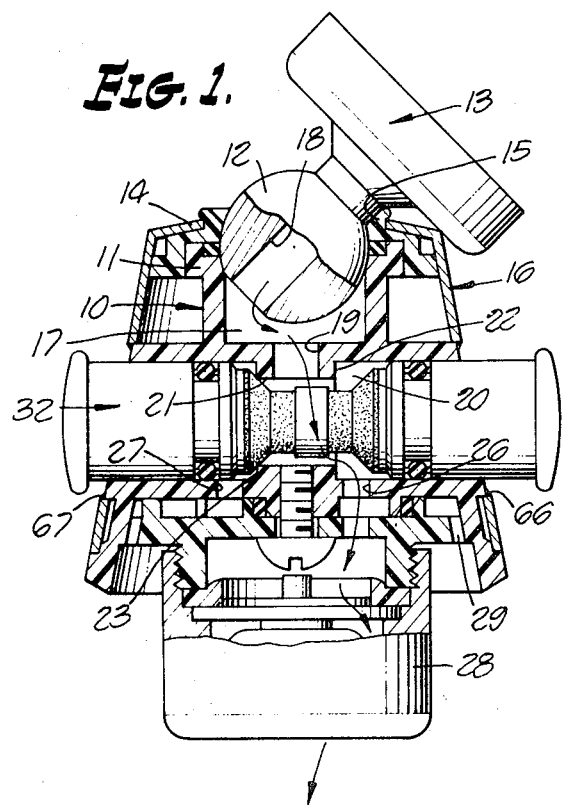
FIG. 1 is a cross-sectional elevational view of an assembly according to the concepts of the present invention with the valve thereof positioned to provide an aerated flow.
Figure 2:
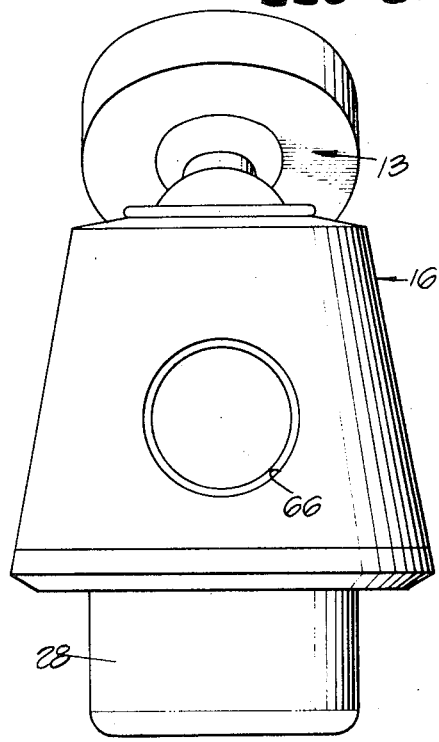
FIG. 2 is a side elevational view of the device of FIG. 1.

FIG. 5 is an enlarged cross-sectional view of a portion of the apparatus of FIG. 1; and FIGS. 6 and 7 are partial cross-sectional views taken along respective lines 6—6 and 7—7 of FIG. 5.

Turning now to the drawings, a swinging spray assembly according to the concepts of the present invention is shown and includes a body 10 having an upper end 11 coupled with the ball 12 of a ball fitting 13 by means of a swivel gasket 14 and ball retainer 15. A shell 16, which will be described in greater detail subsequently, maintains the ball retainer 15, gasket 14 and body 10 in engagement with the ball 12. The upper end 11 of the body 10 includes an inlet chamber 17 in fluid communication with a passageway 18 through the ball fitting 13, and in fluid communication through an orifice 19 with a valve chamber 20. An internal flange 21 in the body 10 forms a pair of valve seats 22 and 23 in the intermediate section, or valve chamber 20 of the body 10. The lower portion of the body 10 includes a pair of apertures 26 and 27 which provide selective communication of fluid respectively with either a conventional aerator 28 or spray apertures 29.

Turning now to the valve 32 provided in the swinging spray assembly, the same includes a pair of valve plugs 33 and 34, an intermediate valve spacer 35, and collar buttons 36 and 37, all secured together by a screw 38. The valve further includes a pair of O-rings 40 and 41 disposed in annular grooves 43 and 42 of the respective valve plugs 33 and 34. Additionally, buttons 45 and 46, which provide decorative covers, are positioned in the outer ends of the valve plugs 33 and 34 in a manner best seen in FIG. 5.

Figure 4:
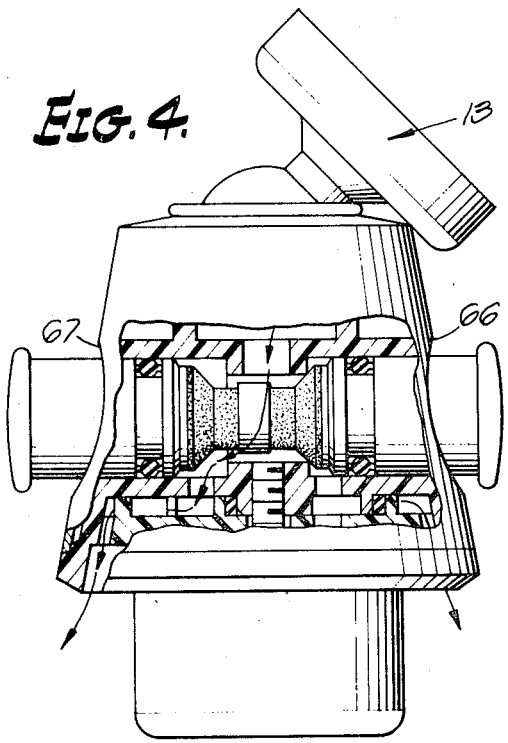
FIG. 4 is a partial cross-sectional elevational view similar to that of FIG. 1, but illustrating the valve of the assembly positioned to provide a spray flow.
Figure 3:
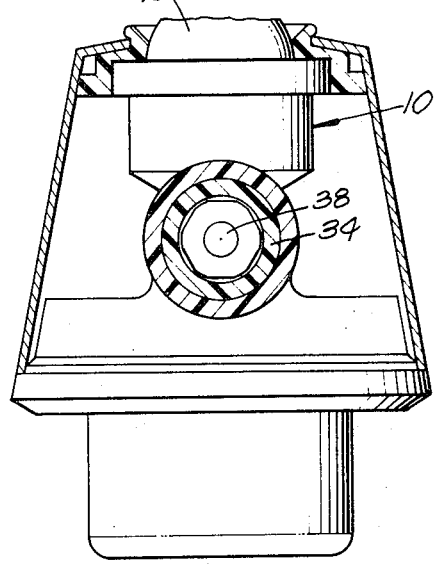
FIG. 3 is a partial cross-sectional side elevational view of the device of FIG. 1.

The valve spacer 35 has an intermediate enlarged portion 48 against which the inner ends of the collar buttons 36 and 37 abut, and the collar buttons have respective enlarged conical sections 49 and 50 which abut against the inner faces of the respective valve plugs 33 and 34. These enlarged sections 49 and 50 provide cooperating movable valve seats which cooperate with the respective valve seats 22 and 23 in the valve chamber 20 of the body 10. As will be apparent from an examination of FIGS. 1, 4 and 5, the effective surface area provided by the enlarged section of the collar button which is displaced from one of the valve seats 22 or 23 is substantially larger than the effective area of the other collar button enlarged portion when the latter is against the other of the valve seats 22 and 23. For example, in FIG. 5 the effective area of the enlarged portion 49 of the collar button 36 is substantially larger than the effective area of the enlarged portion 50 of the button 37 seen by the fluid flow entering orifice 19 and this enables the fluid pressure to maintain the valve 32 in the right-hand position as seen in FIG. 5. On the other hand, the effective area of the enlarged section 50 of the collar button 37 in FIG. 4 is larger than the effective area of the enlarged section 49 seen by the fluid thereby serving to maintain the valve 32 in its left-hand position as seen in FIG. 4. Furthermore inlet fluid flow is normal to the axis of the valve 32 so that it is not necessary to overcome substantial fluid pressure when moving the valve from one position to the other.

A nozzle adapter 55 is secured to the lower end 54 of the body by means of a screw 56. A conventional aerator 28 is threadably secured to the lower end of the nozzle adapter 55. A nozzle adapter gasket 57 is mounted between the nozzle adapter and the lower end of the body to provide a sealed passageway through the opening 26 in the body 10 and in opening 58 in the nozzle adapter 55. A similar opening 27 is provided in the lower end 54 of the body 10 and communicates with an essentially annular area 60 defined between the upper end of the nozzle adapter 55 and the lower surface of 54 and skirt 61 of the body 10. The nozzle adapter 55 includes a plurality of upwardly depending fingers 62 which space the nozzle adapter from the lower surface of the bottom end 54 of the body 10, and includes a plurality of slots 29 to provide a spray of fluid when the valve 32 is in the position shown in FIG. 4.

The skirt 61 of the body 10 has a lower lip 65 against which the lower edge of the shell 16 abuts. The shell 16 has openings 66 and 67 which fit on the substantially cylindrical extremities 68 and 69 of the intermediate portion of the body 10 so as to maintain the shell 16 in position on the assembly.

Most of the components of the present assembly may be formed from a suitable plastic. For example, the body 10, valve plugs 33–34, buttons 45–46, and nozzle adapter 55 may be all formed from a suitable plastic such as that sold under the tradename Delrin. The collar buttons 36–37, O-rings 40–41 and gaskets 14 and 57 preferably are formed of a resilient rubber or plastic material. The valve spacer 35, ball fitting 13 and screws 38 and 56 may be formed of brass. The shell 16 preferably is of stainless steel.

The present embodiment of this invention is to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. A combined aerator-spray assembly for selectively providing a flow of fluid or a spray of fluid comprising
   body means having an inlet chamber for receiving fluid, and including a valve chamber communicating with and positioned below said inlet chamber and including valve seats forming an internal shoulder in said valve chamber, and outlets communicating with said valve chamber for respectively providing said flow of fluid or said spray of fluid, valve means extending through said body means and disposed within said valve chamber and selectively reciprocal therein to provide fluid communication from said inlet chamber selectively to one or the other of said outlets, said valve means including an intermediate section having resilient button members thereon selectively engageable with said valve seats, said button members providing a larger effective surface area when positioned away from one of said valve seats than when in contact with one of said valve seats for enabling said valve means to remain in the selected position independent of fluid flow, and
   means for coupling an aerator to said body means.

2. An assembly as in claim 1 wherein
   said valve means comprises a pair of valve plugs spaced apart by a valve spacer, and said button members are disposed on said valve spacer intermediate said valve plugs.

3. An assembly as in claim 1 wherein
   said body means includes nozzle adapter means having a first passageway communicating with the first of said outlets and coupled the aerator, and having a spray forming member communicating with the second of said outlets.

4. An assembly as in claim 1 wherein
   said body means includes nozzle adapter means having a first passageway communicating with the first of said outlets and coupled in fluid communication with the aerator, and having a spray forming member communicating with the second of said outlets, and
   said valve means comprises a pair of valve plugs spaced apart by a valve spacer secured at said intermediate section thereof, and said button members are disposed on said valve spacer intermediate said valve plugs.

5. An assembly as in claim 4 wherein
   said valve spacer has an intermediate enlarged portion with said button members disposed on opposite sides of said intermediate portion of said valve spacer and said button members flare outwardly generally from the axis of said valve spacer thereby defining enlarged movable valve seats cooperating with the valve seats of said body means.

6. An assembly as in claim 1 wherein
   said body means includes nozzle adapter means having a first passageway communicating with said valve chamber through the first of said outlets to said aerator means, and a second substantially annular passageway communicating with the second of said outlets, said nozzle adapter means having a plurality of peripheral slots communicating with said substantially annular passageway for providing said spray of fluid.

7. A combined aerator-spray assembly for selectively providing a flow of fluid or a spray of fluid comprising
   a body having an inlet chamber for receiving fluid, a valve chamber communicating with and positioned below said inlet chamber, and outlets communicating with said valve chamber for respectively providing selectable outlet flows of fluid, said valve chamber having an internal shoulder defining valve seats,
   nozzle adapter means coupled with said body and including first and second passageways respectively communicating with said outlets of said body, the second of said passageways terminating in a plurality of openings for providing said spray of fluid,
   valve means extending through said body means and disposed within said valve chamber and selectively movable therein to provide fluid communication from said inlet chamber selectively to one or the other of said outlets in said body, said valve means including an intermediate section having resilient button members thereon with enlarged portions respectively selectively engageable with said valve seats of said body to provide a larger effective surface area when positioned away from one of said valve seats of said body than when in contact with one of said valve seats of said body for enabling said valve means to remain in the selected position independent of fluid flow, and
   means for coupling an aerator with said nozzle adapter means and communicating with said first passageway of said nozzle adapter means to provide an aerated flow of fluid.

* * * * *

Disclaimer 3,722,798.—*James H. Bletcher*, Pacific Palisades, and *Jack K. Rauh*, Hacienda Heights, Calif. COMBINED AERATOR-SPRAY ASSEMBLY. Patent dated Mar. 27, 1973. Disclaimer filed Feb. 23, 1976, by the assignee, *Pearl White Bletcher*, part interest.

Hereby enters this disclaimer to her entire interest in all claims of said patent.

[*Official Gazette June 1, 1976.*]